(12) United States Patent
Lee et al.

(10) Patent No.: US 6,933,080 B2
(45) Date of Patent: Aug. 23, 2005

(54) POLYMER ELECTROLYTE, PREPARATION METHOD FOR THE SAME AND LITHIUM BATTERY USING THE SAME

(75) Inventors: Kyoung-hee Lee, Cheonan (KR); Ki-ho Kim, Cheonan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 390 days.

(21) Appl. No.: 10/136,431

(22) Filed: May 2, 2002

(65) Prior Publication Data

US 2003/0003368 A1 Jan. 2, 2003

(30) Foreign Application Priority Data

May 3, 2001 (KR) .......................................... 2001-24041

(51) Int. Cl.⁷ ................................................ H01M 6/18
(52) U.S. Cl. ........................ 429/317; 429/303; 429/309; 252/62.2
(58) Field of Search ................................ 429/300–303, 429/309, 317; 252/62, 62.2

(56) References Cited

U.S. PATENT DOCUMENTS

| 4,792,504 A | 12/1988 | Schwab et al. |
| 4,798,773 A | * 1/1989 | Yasukawa et al. .......... 429/313 |
| 4,830,939 A | 5/1989 | Lee et al. |
| 4,908,283 A | 3/1990 | Takahashi et al. |
| 5,817,016 A | * 10/1998 | Subramaniam ............. 600/372 |

FOREIGN PATENT DOCUMENTS

| DE | 4431773 A1 | * 3/1995 | ........... C08F/20/28 |
| EP | 1037294 A2 | * 9/2000 | ............ H01M/6/18 |
| JP | 63-94501 | 4/1988 | |
| JP | 3-195713 | 8/1991 | |
| JP | 10-130346 | 5/1998 | |
| JP | 10130346 A | * 5/1998 | ......... C08F/290/06 |
| KR | 2002-77732 | 10/2002 | |

* cited by examiner

Primary Examiner—Laura Weiner
(74) Attorney, Agent, or Firm—Stein, McEwen & Bui, LLP

(57) ABSTRACT

A polymer electrolyte is formed by curing a composition prepared by mixing a polymer of compounds of polyethylene glycol di(meth)acrylates and/or multi-functional ethyleneoxides; one selected from a vinylacetate monomer, a (meth)acrylate monomer, and a mixture of a vinylacetate monomer and a (meth)acrylate monomer; and an electrolytic solution containing a lithium salt and an organic solvent.

18 Claims, 1 Drawing Sheet

POLYMER ELECTROLYTE, PREPARATION METHOD FOR THE SAME AND LITHIUM BATTERY USING THE SAME

CROSS-REFERENCE TO RELATED APPLICATION

This application claims the benefit of Korean Application No. 2001-24041, filed on May 3, 2001 in the Korean Intellectual Property Office, the disclosure of which is incorporated herein by reference.

BACKGROUND OF THE INVENTION

1. Field of the Invention

The present invention relates to a polymer electrolyte, a preparation method for the same, and a lithium battery using the same, and more particularly, to a polymer electrolyte having good ionic conductivity at room temperature and good mechanical properties, and a lithium battery using the polymer electrolyte.

2. Description of the Related Art

Since it is known in the art that polymer electrolytes exhibit high ionic conductivity at room temperature, polymer electrolytes have been used as electrolyte materials for a variety of kinds of electrochemical batteries. In addition, various kinds of research have been actively carried out into polymer electrolytes having good conductivity characteristics at room temperature. The research has focused mostly on plasticized polymer electrolytes containing a liquid electrolyte. The plasticized polymer electrolytes are prepared by adding a large amount of the liquid electrolyte into a polymer matrix. The plasticized polymer electrolytes are known to substantially contribute to making lithium polymer batteries practical.

In the above-described gel polymer electrolyte, usable polymer matrices that form polymers include curable polymers based on polyethylene-glyco-di(meth)acrylate, polyacrylonitrile, polyethyleneoxide, poly(methyimethacrylate) and combinations thereof. Examples of these polymer electrolytes disclosed are as follows. U.S. Pat. No. 4,908,283 discloses a polymer electrolyte prepared by curing a composition comprising acryloyl-denatured polyalkylene oxide. U.S. Pat. No. 4,792,504 describes a polymer electrolyte comprising polyethylene glycol dimethacrylate/polyethylene oxide. Japanese Patent Publication No. showa 63-94501 discloses a polymer electrolyte comprising acryloyl-denatured polyalkylene oxide and an inorganic salt and cured by actinic radiation. Also, U.S. Pat. No. 4,830,939 discloses a method of preparing plasticized polymer electrolytes by mixing polyethylene glycol dimethacrylate and liquid electrolyte and curing the same.

However, the polymer electrolytes prepared by the above-described methods are poor in mechanical strength while having good ionic conductivity characteristics.

SUMMARY OF THE INVENTION

To solve the above and other problems, it is an object of the present invention to provide a polymer electrolyte having good ionic conductivity and having improved mechanical strength and a manufacturing method thereof.

It is another object of the present invention to provide a lithium battery having improved processibility, a high-rate discharging characteristic, and a low-temperature discharging characteristic by using the polymer electrolyte.

Additional objects and advantages of the invention will be set forth in part in the description which follows and, in part, will be obvious from the description, or may be learned by practice of the invention.

To accomplish the above and other objects of the present invention, a polymer electrolyte according to an embodiment of the invention includes a cured product of a polymer electrolyte forming composition comprising a polymer of compounds of polyethylene glycol di(meth)acrylates represented by formula 1 and/or multi-functional ethyleneoxides represented by formula 2; one selected from a vinylacetate monomer represented by formula 3, a (meth)acrylate monomer represented by formula 4 and a mixture thereof; and an electrolytic solution containing a lithium salt and an organic solvent:

Formula 1
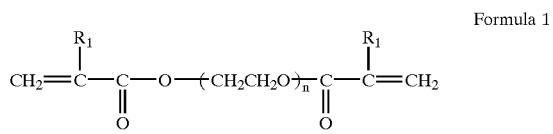

Formula 2
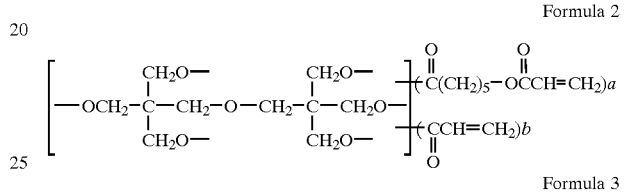

Formula 3, Formula 4
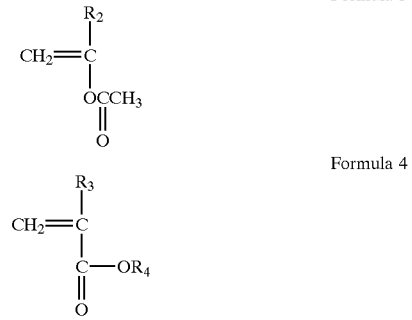

wherein $R_1$ is H or $CH_3$, n is an integer from 1 to 100,000, $R_2$ is H or $CH_3$, $R_3$ is H or $CH_3$, $R_4$ is an alkyl having 1 to 20 carbon atoms, and the sum of a and b is 6.

According to an aspect of the invention, a mixture ratio by weight of the polymer of compounds of polyethylene glycol di(meth)acrylates represented by formula 1 and/or multi-functional ethyleneoxides represented by formula 2 to the one selected from a vinylacetate monomer represented by formula 3, a (meth)acrylate monomer represented by formula 4 and a mixture thereof, is at or between 1:0.0001 and 0.0001:1.

According to a further aspect of the invention, the mixture ratio by weight of the total of the polymer of compounds of polyethylene glycol di(meth)acrylates represented by formula 1 and/or multi-functional ethyleneoxides represented by formula 2 and the one selected from a vinylacetate monomer represented by formula 3 and a mixture of a vinylacetate monomer represented by formula 3 and a (meth)acrylate monomer represented by formula 4 to the electrolytic solution, is at or between 1:0.1 and 1:50.

According to another aspect of the invention, the polymer electrolyte forming composition further includes a curing initiator and a curing catalyst.

According to yet another aspect of the invention, the curing initiator is at least one selected from the group consisting of diacyl peroxides such as dibenzoyl peroxide, succinic acid peroxide, dilauroyl peroxide and didecanoyl peroxide; dicumyl peroixides; di-t-butylperoxides; dialkyl peroxides such as 2,5-dimethyl-2,5-di)-t-butylperoxy) hexane; peroxy esters such as α-cumyl peroxyneodecanoate, 1,1-dimethyl-3-hydroxybutyl peroxy-2-ethyl hexanoate, t-amylperoxy-benzoate and t-butyl peroxypivalate; tertiary alkyl hydroperoxides such as 2,5-dihydroperoxy-2,5-dimethylhexane, cumene hydroperoxide and t-butyl hydroperoxide; peroxy ketals such as 1,1-di-(t-amylperoxy)-cyclohexane, 2,2-di-(t-butylperoxy)butane and ethyl 3,3-di-(t-butylperoxy)-butylate; peroxydicarbonates such as di(n-propyl) peroxy-dicarbonate, di(sec-butyl) peroxy-dicarbonate and di(2-ethylhexyl)peroxydicarbonate; and azos such as azobisisobutyronitrile, and the content thereof is in a range of 0.0001 to 10 parts by weight, based on 100 parts by weight of the total of the polymer of compounds of polyethylene glycol di(meth)acrylates represented by formula 1 and/or multi-functional ethyleneoxides represented by formula 2 and the one selected from a vinylacetate monomer represented by formula 3, a (meth) acrylate monomer represented by formula 4 and a mixture thereof.

According to still another aspect of the invention, the curing catalyst includes one or more amines selected from the group consisting of triethylamine, tributylamine, triethanolamine, N-benzyldimethylamine, and the content thereof is in a range of 0.01 to 2.0 parts by weight, based on 100 parts by weight of the total of the polymer of compounds of polyethylene glycol di(meth)acrylates represented by formula 1 and/or multi-functional ethyleneoxides represented by formula 2 and the one selected from a vinylacetate monomer represented by formula 3, a (meth)acrylate monomer represented by formula 4 and a mixture thereof.

According to another embodiment of the present invention, a method of preparing a polymer electrolyte includes preparing a polymer electrolyte forming composition by mixing a polymer of compounds of polyethylene glycol di(meth)acrylates represented by formula 1 and/or multi-functional ethyleneoxides represented by formula 2, one compound selected from a vinylacetate monomer represented by formula 3, a (meth)acrylate monomer represented by formula 4 and a mixture thereof, and an electrolytic solution containing a lithium salt and an organic solvent:

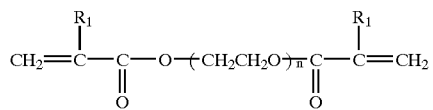

Formula 1

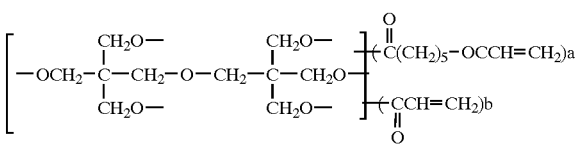

Formula 2

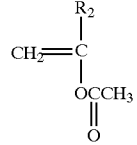

Formula 3

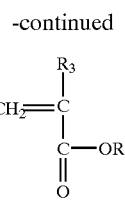

Formula 4 wherein $R_1$ is H or $CH_3$, n is an integer from 1 to 100,000, $R_2$ is H or $CH_3$, $R_3$ is H or $CH_3$, $R_4$ is an alkyl having 1 to 20 carbon atoms, and the sum of a and b is 6; and casting the polymer electrolyte forming composition and curing the same by heat or ultraviolet light.

According to still another embodiment of the present invention, a lithium battery includes a cathode, an anode, and a polymer electrolyte interposed between the cathode and the anode, the polymer electrolyte comprising a cured product of a polymer electrolyte forming composition comprising a polymer of compounds of polyethylene glycol di(meth)acrylates represented by formula 1 and/or multi-functional ethyleneoxides represented by formula 2; one selected from a vinylacetate monomer represented by formula 3, a (meth)acrylate monomer represented by formula 4 and a mixture thereof; and an electrolytic solution containing a lithium salt and an organic solvent.

According to another aspect of the invention, the lithium battery further comprises a separator made from an insulative resin and which is disposed between the cathode and the anode.

According to yet another aspect of the invention, the separator is made of a material selected from the group consisting of a single-layered polyethylene or polypropylene separator, a double-layered separator of polyethylene/polypropylene, and a triple-layered separator of polyethylene/polypropylene/polyethylene or polypropylene/polyethylene/polypropylene.

BRIEF DESCRIPTION OF THE DRAWING

These and other objects and advantages of the invention will become apparent and more readily appreciated from the following description of the embodiments, taken in conjunction with the accompanying drawing of which.

DETAILED DESCRIPTION OF THE EMBODIMENTS

Figure 1:
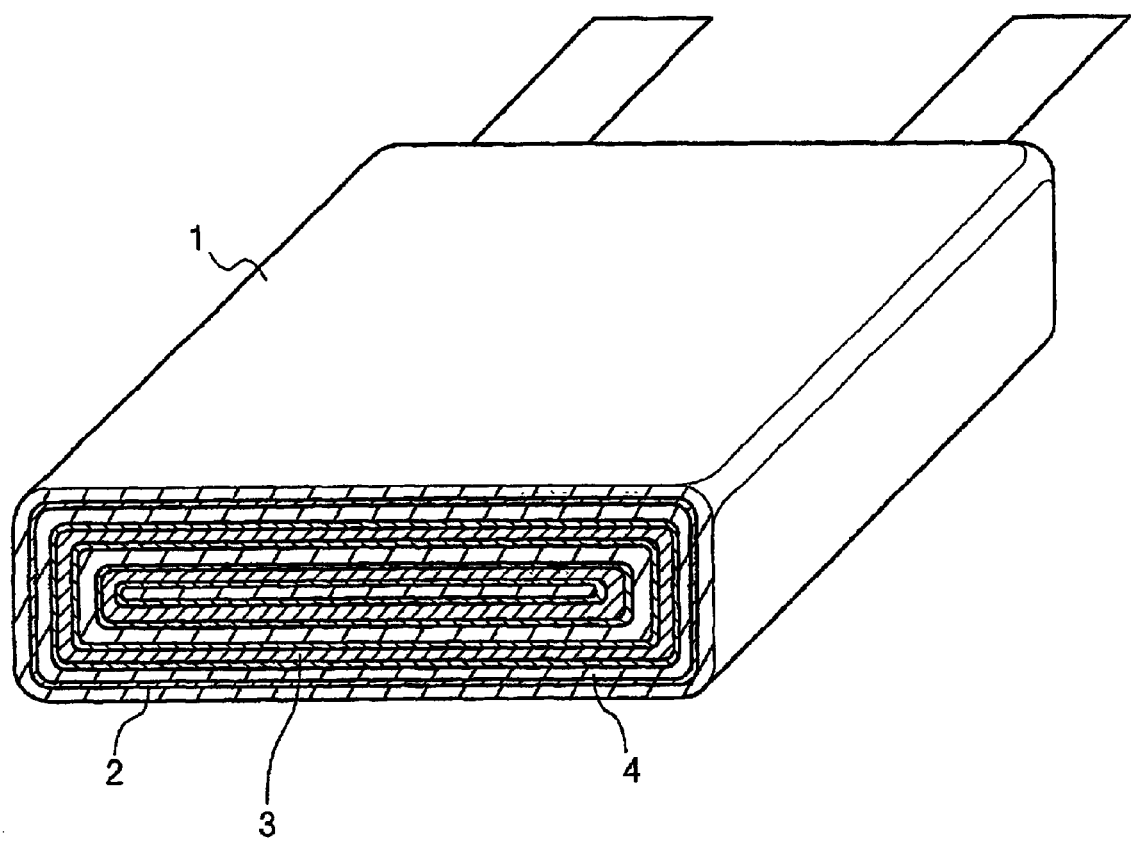
FIG. 1 shows a lithium battery according to an embodiment of the present invention.

Reference will now be made in detail to the present embodiments of the present invention, examples of which are illustrated in the accompanying drawing and specific examples, wherein like reference numerals refer to the like elements throughout. The embodiments are described below in order to explain the present invention by referring to the figure and specific examples.

In general, ionic conductivity and mechanical properties of a polymer electrolyte are greatly affected by the degree of crosslinking of a polymer used to form a polymer matrix. When using polyethylene glycol di(meth)acrylate alone as a polymer to form the polymer matrix, the polymer exhibits a weak mechanical property due to a high degree of crosslinking while having a good ionic conductivity. Therefore, the present invention is directed to a reduction of the degree of crosslinking of a polymer electrolyte by adding a polymer of compounds of polyethylene glycol di(meth)acrylates represented by formula 1 and/or multi-functional ethyleneoxides represented by formula 2 with a vinylacetate monomer represented by formula 3, a (meth)acrylate monomer represented by formula 4 or a mixture thereof. As described above, if the degree of crosslinking in the polymer electrolyte is reduced, the mobility of lithium ions at low temperature can be increased and the mechanical properties and processibility of the polymer electrolyte can be improved.

Formula 1

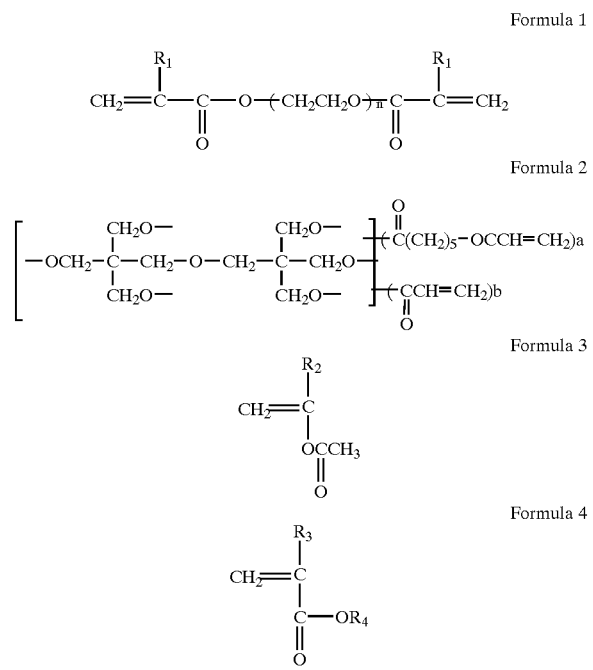

Formula 2

Formula 3

Formula 4 wherein $R_1$ is H or $CH_3$, n is an integer from 1 to 100,000, $R_2$ is H or $CH_3$, $R_3$ is H or $CH_3$, $R_4$ is an alkyl having 1 to 20 carbon atoms, and the sum of a and b is 6, in which it is preferred that a is 2 and b is 4.

A method of preparing a polymer electrolyte according to an embodiment of the present invention will now be described. The material used to form the polymer matrix is prepared by mixing a polymer of compounds of polyethylene glycol di(meth)acrylates represented by formula 1 and/ or multi-functional ethyleneoxides represented by formula 2 with one selected from a vinylacetate monomer represented by formula 3, a (meth)acrylate monomer represented by formula 4 and a mixture thereof. The material used to form the polymer matrix is mixed with an electrolytic solution including a lithium salt and an organic solvent, thereby obtaining a composition use to form the polymer electrolyte.

In the polymer electrolyte forming composition, the mixture ratio by weight of the polymer matrix forming material to the electrolytic solution is 1:0.1 to 1:50 according to an aspect of the invention. If the content of the polymer matrix forming material relative to the content of the electrolytic solution exceeds the above range, the mechanical property of the polymer electrolyte film deteriorates and the ionic conductivity characteristic thereof becomes low. If the content of the polymer matrix forming material relative to the content of the electrolytic solution is less than the above range, the reactivities of the precursors used to form the polymer electrolyte film are lowered, making it difficult to obtain the polymer electrolyte film.

In the material used to form the polymer matrix according to an aspect of the invention, the mixture ratio by weight of the polymer of compounds of polyethylene glycol di(meth) acrylates represented by formula 1 and/or multi-functional ethyleneoxides represented by formula 2 to the one selected from a vinylacetate monomer represented by formula 3 and a mixture of a vinylacetate monomer represented by formula 3 and a (meth)acrylate monomer represented by formula 4, is between 1:0.0001 and 0.0001:1, and preferably between 1:0.01 and 0.01:1. If the ratio exceeds the above range, the mechanical property of the polymer electrolyte film deteriorates. If the ratio is less than the above range, the reactivities of the precursors used to form the polymer electrolyte film are lowered, making it difficult to obtain the polymer electrolyte film.

According to another aspect of the invention, the polyethylene glycol di(meth)acrylate has a weight-average molecular weight of 170 to 4,400,000, and preferably 200 to 100,000. If the weight-average molecular weight exceeds the above range, the mechanical property of a film formed by polymerization of the polyethylene glycol di(meth) acrylate becomes undesirably weak. In the (meth)acrylate monomer represented by formula 4, $R_4$ is a methyl or ethyl group according to an aspect of the invention.

A curing initiator and a curing catalyst are further added to the composition to form the polymer electrolyte according to an aspect of the invention, and mixed to obtain a homogenized solution. However, the curing initiator and/or the curing catalyst need not be used in all aspects of the invention. The curing catalyst is added to improve the curing speed. Examples of the curing catalyst include but are not limited to, one or more amines selected from the group consisting of triethylamine, tributylamine, triethanolamine, N-benzyldimethylamine. The content of the curing catalyst added is in the range of 0.01 to 2.0 parts by weight, based on 100 parts by weight of the polymer matrix forming material. If the content of the curing catalyst is greater than 2.0 parts by weight, the electrochemical property of the polymer electrolyte deteriorates. If the content of the curing catalyst is less than 0.01 parts by weight, the curing reaction is not carried out smoothly, which is undesirable.

Usable curing initiators include, but are not limited to, at least one selected from the group consisting of diacyl peroxides such as dibenzoyl peroxide, succinic acid peroxide, dilauroyl peroxide and didecanoyl peroxide; dicumyl peroixides; di-t-butylperoxides; dialkyl peroxides such as 2,5-dimethyl-2,5-di)-t-butylperoxy)hexane; peroxy esters such as α-cumyl peroxy-neodecanoate, 1,1-dimethyl-3-hydroxybutyl peroxy-2-ethyl hexanoate, t-amylperoxybenzoate and t-butyl peroxy-pivalate; tertiary alkyl hydroperoxides such as 2,5-dihydroperoxy-2,5-dimethylhexane, cumene hydroperoxide and t-butyl hydroperoxide; peroxy ketals such as 1,1-di-(t-amylperoxy)-cyclohexane, 2,2-di-(t-butylperoxy)butane and ethyl 3,3-di-(t-butylperoxy)-butylate; peroxydicarbonates such as di(n-propyl) peroxydicarbonate, di(sec-butyl) peroxy-dicarbonate and di(2-ethylhexyl)peroxy-dicarbonate; and azos such as azobisisobutyronitrile. The content of the curing initiators is in the range of 0.0001 to 10 parts by weight, based on 100 parts by weight of the polymer matrix forming material.

In particular, when using the multi-functional ethylene oxide polymer represented by formula 2 according to an aspect of the invention, peroxides such as diacyl peroxides, dialkyl peroxides, peroxy esters, peroxy ketals or peroxy dicarbonates, are preferably used as the curing initiator. This is due to the use of a gas forming compound such as azobisisobutyronitrile, which may generate gas that roughens the surface of the polymer electrolyte formed on an electrode plate.

Then, the resultant mixture is cast on a support substrate and cured by heat or ultraviolet radiation. The support substrate is a glass substrate or a TEFLON substrate. The curing temperature is in the range of 25 to 85° C., and preferably 60 to 80° C. If the curing temperature is higher than 85° C., volatilization of the liquid electrolyte or decomposition of the lithium salt may result. If the curing temperature is lower than 25° C., the curing reaction may not take place properly. However, it is understood that other support structures and/or temperatures can be used.

When the curing is completed, the support substrate is subjected to stripping, thereby obtaining a polymer electrolyte according to an embodiment of the present invention.

In the above-described method of preparing the polymer electrolyte, any organic solvent can be used that is generally used in the manufacture of a lithium battery. Examples of the organic solvent include at least one selected from the group consisting of propylene carbonate, ethylene carbonate, dimethylcarbonate, diethylcarbonate, methylethylcarbonate, tetrahydrofuran, 2-methylhydrofuran, diethoxyethane, methylformate, ethylformate and γ-butyrolactone. The content of the organic solvent is in the range of 90 to 99.9 parts by weight, based on 100 parts by weight of the electrolytic solution.

Usable examples of the lithium salt forming the electrolytic solution include at least one selected from the group consisting of $LiClO_4$, $LiBF_4$, $LiPF_6$, $LiCF_3SO_3$, and $LiN(CF_3SO_2)_2$. The content of the lithium salt is in the range of 0.1 to 10 parts by weight, based on 100 parts by weight of the electrolytic solution.

In order to improve the mechanical strength and the performance at the interface with electrodes, additives, such as an adhesion enhancer, a filler or the like, are further added to the polymer electrolyte forming composition according to an aspect of the invention. However, these additives need not be used in all aspects of the invention.

As shown in FIG. 1, a lithium-sulfur battery according to an embodiment of the present invention includes a case 1 containing a positive electrode (i.e., a cathode) 3, a negative electrode (i.e., an anode) 4, and a separator 2 interposed between the positive electrode 3 and the negative electrode 4. The polymer electrolyte is disposed between the positive and negative electrodes 3, 4.

A method of preparing a lithium battery using the polymer electrolyte according an embodiment of to the present invention will be described. A cathode 3 and an anode 4 are manufactured by the same method generally used in the manufacture of a lithium battery. Here, a lithium composite oxide, a transition metal compound or a sulfur compound can be used as a cathode active material, and a lithium metal, carbonaceous material or graphite can be used as an anode active material.

Then, the thus-prepared polymer electrolyte is interposed between the cathode 3 and the anode 4, followed by winding or stacking, to form an electrode assembly. The resultant electrode assembly is put into a battery case 1, thereby assembling a battery. Thereafter, an electrolytic solution containing an organic solvent and a lithium salt is injected into the battery case 1, thereby completing a lithium battery. The electrolytic solution can be the same or different from that used to prepare the polymer electrolyte.

Another method of preparing a lithium battery according to another embodiment of the present invention will be described. Like in the above-described preparation method, a composition used to form a polymer electrolyte is first prepared. Separately, a cathode 3 and an anode 4 are prepared, respectively, in the same manner as described above. Then, a separator 2 made from an insulating resin having a network structure is interposed between the cathode and the anode, followed by winding or stacking, to form an electrode assembly. The electrode assembly is put into a battery case 1, thereby assembling a battery. According to an aspect of the invention, the separator 2 is a single-layered polyethylene or polypropylene separator, a double-layered separator of polyethylene/polypropylene, or a triple-layered separator of polyethylene/polypropylene/ polyethylene or polypropylene/polyethylene/polypropylene. Thereafter, the polymer electrolyte forming composition is injected into the battery case 1 accommodating the electrode assembly, and thermally treated to perform a polymerization reaction in the battery, thereby completing a lithium battery.

In the above-described preparation method, the thermal treatment temperature is in the range of 20 to 850° C., preferably 60 to 80° C., according to aspects of the invention. The deviation of the thermal treatment temperature from the above range entails the same disadvantage as above.

According to the above-described preparation method, a polymer formed by polymerization of unsaturated groups present in the polyethylene glycol di(meth)acrylate represented by formula 1 or the multi-functional ethyleneoxide compound represented by formula 2, is completely dissolved in the electrolytic solution and gelled at room temperature. In such a manner, a gel-type polymer electrolyte is formed on an insulative resin sheet and a solid polymer electrolyte existing in the network structure of the insulative resin sheet is completed.

The thickness of the polymer electrolyte coated on the insulative resin sheet having a network structure is in the range of 5 to 90 μm according to an aspect of the invention. The polymer electrolyte has good ionic conductivity within this range of thickness.

The lithium battery according to the present invention is not specifically limited from the viewpoint of type or shape, and the present invention can be applied to both lithium primary batteries and lithium secondary batteries.

The present invention will now be described through the following examples. However, the invention is understood to not be limited thereto.

EXAMPLE 1

8.18 g of polyethylene glycol dimethacrylate (i.e., $R_1$ is $CH_3$, n is 8 and the weight-average molecular weight is 506 in formula 1), 0.91 g of vinyl acetate (i.e., $R_2$ is H in formula 3), 0.01 g of azobisisobutyronitrile as a curing initiator, 0.01 g of triethylamine as a curing catalyst and 90.87 g of an electrolytic solution, which is obtained by dissolving 1.3 M $LiPF_6$ in a solvent of ethylene carbonate (EC) and diethyl carbonate (DEC) in the mixture ratio by weight of 3:7, are combined to produce a polymer electrolyte forming composition. Then, the composition was cast on a TEFLON substrate and cured at 80° C. for 2 hours. A film was stripped off from the TEFLON substrate, thereby preparing a polymer electrolyte.

EXAMPLE 2

A polymer electrolyte was prepared in the same manner as in Example 1, except for using 7.27 g of polyethylene glycol dimethacrylate and 1.81 g of vinyl acetate.

EXAMPLE 3

A polymer electrolyte was prepared in the same manner as in Example 1, except for using 6.36 g of polyethylene glycol dimethacrylate and 2.73 g of vinyl acetate.

EXAMPLE 4

A polymer electrolyte was prepared in the same manner as in Example 1, except for using 8.18 g of polyethylene glycol dimethacrylate and 0.46 g of vinyl acetate in preparing a polymer electrolyte forming composition, and further adding 0.45 g of methylmethacrylate (that is, $R_3$ and R4 are both $CH_3$ in formula 3) to the composition.

EXAMPLE 5

A polymer electrolyte was prepared in the same manner as in Example 4, except for using 7.27 g of polyethylene glycol dimethacrylate, 0.91 g of vinyl acetate and 0.91 g of methylmethacryl ate.

EXAMPLE 6

A polymer electrolyte was prepared in the same manner as in Example 4, except for using 6.36 g of polyethylene glycol dimethacrylate, 1.37 g of vinyl acetate and 1.36 g of methylmethacrylate.

EXAMPLE 7

A polymer electrolyte was prepared in the same manner as in Example 1, except for using 8.18 g of multi-functional ethylene oxide GER, 0.46 g of vinyl acetate and 0.46 g of methylmethacrylate.

Comparative Example 1

10 g of polyethylene glycol dimethacrylate, 100 g of 1 M $LiPF_6$, 100 g of propylene carbonate (PC) and 0.1 g of benzophenone were homogenously mixed and the resulting mixture was cast on an organic plate and subjected to UV radiation, thereby obtaining a polymer electrolyte film (refer to U.S. Pat. No. 4,830,939.).

EXAMPLE 8

94 g of $LiCoO_2$, 3 g of Super P conductive carbon, 3 g of polyvinylidenefluoride (PVDF) were dissolved in N-methyl-2-pyrrolidone to produce a cathode active material slurry. Then, an aluminum (Al) foil having a width of 4.9 cm and a thickness of 147 $\mu$m was coated with the cathode active material slurry, dried, rolled and cut into a predetermined size to prepare a cathode.

89.8 g of mezocarbon fiber (MCF, available from PETCOA, LTD.), 0.2 g of oxalic acid and 10 g of PVDF were dissolved in N-methyl-2-pyrrolidone to produce an anode active material slurry. Then, a copper (Cu) foil having a width of 5.1 cm and a thickness of 178 $\mu$m was coated with the anode active material slurry, dried, rolled and cut into a predetermined size to prepare an anode.

A separator was interposed between the cathode and the anode and wound to prepare an electrode assembly. The electrode assembly was put into a battery case, and a precursor/initiator/liquid electrolyte mixture was injected into the battery case under reduced pressure.

The resultant product was cured at 80° C. for 2 hours, thereby completing a lithium secondary battery. Here, an electrolytic solution obtained by dissolving 1.3 M $LiPF_6$ in a solvent of ethylene carbonate (EC) and diethyl carbonate (DEC) in the mixture ratio by weight of 3:7 was used as the electrolytic solution.

The polymer electrolytes prepared in Examples 1–7 and Comparative Example 1 were made into disk-shaped pellets and were allowed to contact stainless steel electrodes to measure ionic conductivity at room temperature. The measurement results showed that the polymer electrolytes prepared in Examples 1–7 had superb ionic conductivities of $3.1\times10^{-3}$, $4.2\times10^{-3}$, $4.0\times10^{-3}$, $3.8\times10^{-3}$, $5.2\times10^{-3}$, $5.2\times10^{-3}$ and $5\times10^{-3}$ Scm, respectively. The ionic conductivity of the polymer electrolyte prepared in Comparative Example 1 was substantially the same as in Examples 1–7.

Then, the ductility and mechanical strength of the polymer electrolytes prepared in Examples 1–7 and Comparative Example 1 were evaluated. Here, evaluation of the ductility and mechanical strength were made by investigating the state of each polymer electrolyte film after the film was pressed by hand. The evaluation tests showed that the polymer electrolytes prepared in Examples 1–7 were not broken due to their resilience even if they were pressed, whereas the polymer electrolyte prepared in Comparative Example 1 was broken when it was pressed. Thus, it was confirmed that the polymer electrolytes prepared in Examples 1–7 had better ductility and mechanical strength than the polymer electrolyte prepared in Comparative Example 1.

In the lithium secondary battery prepared in Example 8, the rate-dependent discharge capacity at room temperature and the discharge capacity at −20° C. were tested. The test results showed that the lithium secondary battery was good in terms of both the rate-dependent discharge capacity at room temperature and the discharge capacity at −20° C.

The rate-dependent discharge characteristics and the low-temperature discharging characteristics of the lithium secondary batteries prepared according to the process in Example 8 and using the polymer electrolytes in Example 1 and Comparative Example 1 were evaluated, and the result thereof is shown in Table 1.

TABLE 1

|  | Standard charge/discharge capacity (mAh) | | | Rate-dependent discharge capacity | | | Low-temperature discharge |
|---|---|---|---|---|---|---|---|
|  | Charging | Discharging | Efficiency (%) | 0.5C (mAh) | 1.0C | 2.0C | capacity (mAh) −20° C. |
| Example 1 | 770.6 | 763.9 | 99.1 | 750.8 | 751.2 | 732.6 | 608.7 |
| Comparative Example 1 | 769.4 | 762.8 | 99.1 | 747.7 | 732.8 | 693.3 | 542.5 |

As shown in Table 1, the lithium secondary battery prepared using the polymer electrolyte of Example 1 has improved rate-dependent discharging characteristic and low-temperature discharging characteristic as compared to the lithium secondary battery prepared using the polymer electrolyte of Comparative Example 1 while maintaining the charging/discharging efficiency at the same level.

According to the present invention, a polymer electrolyte having good ionic conductivity at room temperature and an electrolyte film with good ductility and mechanical strength can be obtained. A lithium battery having an improved high-rate discharging characteristic and low-temperature discharging characteristic can be prepared by using the polymer electrolyte.

Although the present invention has been described with reference to the examples and specific embodiments, the foregoing disclosure should be interpreted as illustrative only and it is understood that various modifications and variations can be easily made by those skilled in the art without departing from the spirit of the invention. Accordingly, a true scope and spirit of the invention should be defined by the following claims and equivalents thereof.

What is claimed is:

1. A polymer electrolyte for a battery comprising a cured product of a polymer electrolyte forming composition comprising:

(a) a polymer consisting of multi-functional ethyleneoxides represented by formula 2, or a mixture of polyethylene glycol di(meth)acrylates represented by formula 1 and multi-functional ethyleneoxides represented by formula 2;

(b) one selected from a group consisting of a vinylacetate monomer represented by formula 3, a (meth)acrylate monomer represented by formula 4, and a mixture thereof; and (c) an electrolytic solution comprising a lithium salt and an organic solvent, wherein:

Formula 1 is

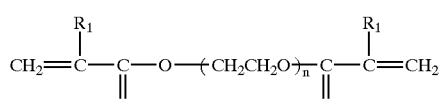

Formula 2 is

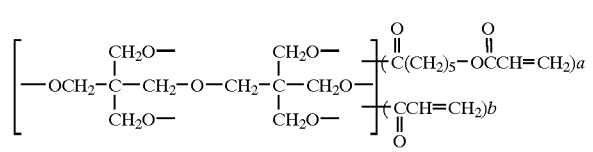

Formula 3 is

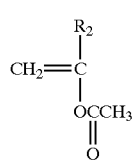

Formula 4 is

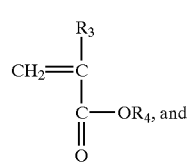

$R_1$ is H or $CH_3$, n is an integer from 1 to 100,000, $R_2$ is H or $CH_3$, $R_3$ is H or $CH_3$, $R_4$ is an alkyl having 1 to 20 carbon atoms, and the sum of a and b is 6.

2. The polymer electrolyte according to claim 1, wherein a mixture ratio by weight of (a) to (b) is at or between 1:0.0001 and 0.0001:1.

3. The polymer electrolyte according to claim 1, wherein a mixture ratio by weight of the total of (a) and (b) is at or between 1:0.1 and 1:50.

4. The polymer electrolyte according to claim 1, wherein $R_4$ is a methyl or ethyl group in the (meth)acrylate monomer represented by formula 4.

5. The polymer electrolyte according to claim 1, further comprising a curing initiator and a curing catalyst.

6. The polymer electrolyte according to claim 5, wherein:

said the curing initiator is at least one selected from the group consisting of dibenzoyl peroxide, succinic acid peroxide, dilauroyl peroxide, didecanoyl peroxide, dicumyl peroxide, di-t-butylperoxide, 2,5-dimethyl-2, 5-di)-t-butylperoxy)hexane, α-cumyl peroxy-neodecanoate, 1,1-dimethyl-3-hydroxybutyl peroxy-2-ethyl hexanoate, t-amylperoxy-benzoate, t-butyl peroxy-pivalate, 2,5-dihydroperoxy-2,5-dimethylhexane, cumene hydroperoxide, t-butyl hydroperoxide, 1,1-di-(t-amylperoxy)-cyclohexane, 2,2-di-(t-butylperoxy)butane, ethyl 3,3-di-(t-butylperoxy)-butylate, di(n-propyl) peroxy-dicarbonate, di(sec-butyl) peroxy-dicarbonate, di(2-ethylhexyl)peroxy-dicarbonate, and azobisisobutyronitrile, and a content thereof is in a range of 0.0001 to 10 parts by weight, based on 100 parts by weight of the total of (a) and (b).

7. The polymer electrolyte according to claim 5, wherein:

said the curing catalyst includes one or more amines selected from the group consisting of triethylamine, tributylamine, triethanolamine, and N-benzyldimethylamine, and a content thereof is in a range of 0.01 to 2.0 parts by weight, based on 100 parts by weight of the total of (a) and (b).

8. The polymer electrolyte according to claim 1, wherein (a) comprises the polyethylene glycol di(meth)acrylate having a weight-average molecular weight of at or between 170 and 4,400,000.

9. The polymer electrolyte according to claim 1, wherein:

the lithium salt is at least one selected from the group consisting of $LiClO_4$, $LiBF_4$, $LiPF_6$, $LiCF_3SO_3$, and $LiN(CF_3SO_2)_2$, and a content thereof is in the range of 0.1 to 10 parts by weight, based on 100 parts by weight of said electroytic solution.

10. The polymer electrolytic according to claim 1, wherein:

the organic solvent is at least one selected from the group consisting of propylene carbonate, ethylene carbonate, dimethylcarbonate, diethylcarbonate, methylethylcarbonate, diethylcarbonate, tetrahydrofuran, 2-methylhydrofuran, diethoxyethane, methylformate, ethylformate and α-butyrolactone, and a content thereof is in the range of 90 to 99.9 parts by weight, based on 100 parts by weight of said electrolytic solution.

11. A lithium battery comprising:

a cathode;

an anode; and a polymer electrolyte claimed in claim 1 interposed between said cathode and said anode.

12. The lithium battery according to claim 11, further comprising a separator comprising an insulative resin and which is disposed between said cathode and said anode.

13. The lithium battery according to claim 12, wherein said separator is one selected from the group consisting of:
- a single-layered separator of polyethylene or polypropylene,
- a double-layered separator of polyethylene/polypropylene, and
- a triple-layered separator of polyethylene/polypropylene/polyethylene or polypropylene/polyethylene/polypropylene.

14. A lithium battery comprising:
- a cathode;
- an anode; and
- a polymer electrolyte claimed in claim 2 interposed between said cathode and said anode.

15. A lithium battery comprising:
- a cathode;
- an anode; and
- a polymer electrolyte claimed in claim 3 interposed between said cathode and said anode.

16. A lithium battery comprising:
- a cathode;
- an anode; and
- a polymer electrolyte claimed in claim 4 interposed between said cathode and said anode.

17. A lithium battery comprising:
- a cathode;
- an anode; and
- a polymer electrolyte claimed in claim 5 interposed between said cathode and said anode.

18. A lithium battery comprising:
- a cathode;
- an anode; and
- a polymer electrolyte claimed in claim 6 interposed between said cathode and said anode.

* * * * *

UNITED STATES PATENT AND TRADEMARK OFFICE
CERTIFICATE OF CORRECTION

PATENT NO.   : 6,933,080 B2
DATED        : August 23, 2005
INVENTOR(S)  : Kyoung-ho Lee et al.

It is certified that error appears in the above-identified patent and that said Letters Patent is hereby corrected as shown below:

<u>Column 12,</u>
Line 45, change "electroytic" to -- electrolytic --.
Line 54, change "α-butyrolactone" to -- γ-butyrolactone --.

Signed and Sealed this

Seventh Day of February, 2006

JON W. DUDAS
*Director of the United States Patent and Trademark Office*